US009286516B2

(12) United States Patent
Bulan et al.

(10) Patent No.: US 9,286,516 B2
(45) Date of Patent: Mar. 15, 2016

(54) METHOD AND SYSTEMS OF CLASSIFYING A VEHICLE USING MOTION VECTORS

(71) Applicant: Xerox Corporation, Norwalk, CT (US)

(72) Inventors: Orhan Bulan, Rochester, NY (US); Edgar A. Bernal, Webster, NY (US); Robert P. Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 211 days.

(21) Appl. No.: 13/914,752

(22) Filed: Jun. 11, 2013

(65) Prior Publication Data

US 2014/0362230 A1 Dec. 11, 2014

(51) Int. Cl.
G06K 9/00 (2006.01)
G06K 9/32 (2006.01)

(52) U.S. Cl.
CPC ........ *G06K 9/00624* (2013.01); *G06K 9/00785* (2013.01); *G06K 9/3241* (2013.01); *G06K 2209/23* (2013.01)

(58) Field of Classification Search
USPC ............... 382/103, 104, 107, 236, 224–225
See application file for complete search history.

(56) References Cited

U.S. PATENT DOCUMENTS

| | | | |
|---|---|---|---|
| 3,110,010 A | 11/1963 | Smith | |
| 3,158,836 A | 11/1964 | McCauley | |
| 3,376,547 A | 4/1968 | Auer, Jr. | |
| 4,812,843 A | 3/1989 | Champion, III et al. | |
| 4,847,772 A | 7/1989 | Michalopoulos et al. | |
| 5,091,727 A | 2/1992 | Mahmood | |
| 5,103,400 A | 4/1992 | Yamada et al. | |
| 5,131,020 A | 7/1992 | Liebesny et al. | |
| 5,163,000 A | 11/1992 | Rogers et al. | |
| 5,199,108 A | 3/1993 | Morgan et al. | |
| 5,241,380 A | 8/1993 | Benson et al. | |
| 5,343,237 A | 8/1994 | Morimoto | |
| 5,396,429 A | 3/1995 | Hanchett | |
| 5,432,508 A | 7/1995 | Jackson | |
| 5,504,314 A | 4/1996 | Farmont | |
| 5,509,082 A | 4/1996 | Toyama et al. | |
| 5,526,041 A | 6/1996 | Glatt | |
| 5,649,300 A | 7/1997 | Snyder et al. | |
| 5,666,157 A | 9/1997 | Aviv | |
| 5,748,107 A | 5/1998 | Kersken et al. | |
| 5,751,973 A | 5/1998 | Hassett | |
| 5,777,951 A | 7/1998 | Mitschele et al. | |
| 5,910,782 A | 6/1999 | Schmitt et al. | |
| 5,940,481 A | 8/1999 | Zeitman | |
| 6,285,297 B1 | 9/2001 | Ball | |
| 6,442,474 B1 | 8/2002 | Trajkovic et al. | |

(Continued)

OTHER PUBLICATIONS http://www.nytimes.com/2011/09/19/nyregion/uprooting-the-old-familiar-parking-meter.html?_4=1&goback+%2Egde_153603_member_72027013, Dated Sep. 18, 2011; 3 pgs.

(Continued)

*Primary Examiner* — Ishrat I Sherali
(74) *Attorney, Agent, or Firm* — Fay Sharpe LLP

(57) ABSTRACT

This disclosure provides methods and systems of classifying a vehicle using motion vectors associated with captured images including a vehicle. According to an exemplary method, a cluster of motion vectors representative of a vehicle within a target region is analyzed to determine geometric attributes of the cluster and/or measure a length of a detected vehicle, which provides a basis for classifying the detected vehicle.

28 Claims, 13 Drawing Sheets

(56) References Cited

U.S. PATENT DOCUMENTS

| | | | |
|---|---|---|---|
| 8,503,725 B2* | 8/2013 | Wu et al. | 382/103 |
| 2012/0148105 A1 | 6/2012 | Burry et al. | |
| 2013/0101171 A1 | 4/2013 | Bulan et al. | |

OTHER PUBLICATIONS

Wren et al., "Pfinder: Real-Time Tracking of the Human Body", in IEEE Transactions on Pattern Analysis and Machine Intelligence, Jul. 1997, vol. 19, No. 7, pp. 780-785.
Friedman et al., "Image segmentation in video sequences: A probabilistic approach", in Proc. of the Thirteenth Conference on Uncertainty in Artificial Intelligence (UAI), Aug. 1-3, 1997, p. 1-13.
Stauffer et al., "Adaptive background mixture models for real-time tracking", in Proc. of the 1999 Conference on Computer Vision and Pattern Recognition (CVPR '99), pp. 2246-2252, 1999.
Makarov et al., "Intrusion detection using extraction of moving edges", in $12^{th}$ IAPR Int. Conf. on Pattern Recognition, vol. 1 of IAPR, pp. 804-807, IEEE Press, 1994.
Paragious et al., "Detection and location of moving objects using deterministic relaxation algorithms", in ICPR, No. 13, pp. 201-286, Vienna, Austria, Aug. 1996.
Oliver et al., "A Bayesian Computer Vision System for Modeling Human Interactions", IEEE Transactions on PAMI, pp. 831-843.
Lo et al., "Automatic congestion detection system for underground platforms," Proc. of 2001 Int Symp. on Intell. Multimedia, Video and Speech Processing, pp. 158-161.
Prati et al., "Shadow Detection Algorithms for Traffic Flow Analysis: a Comparative Study", In Proc. IEEE Intelligent Transportation Systems, 2001.
Cucchiara et al., "Improving Shadow Suppression in Moving Object Detection with HSV Color Information", Proc. of IEEE Intelligent Transportation Systems, 2001.
http://www.sanjoseca.gov/transportation/onstreet_regulations.htm, retrieved from the internet Aug. 6, 2012.
Lima et al., "High Definition Video Broadcast Over Core IP Networks", Mar. 2006, 11 pages.
http://www.portlandoregon.gov/transportation/article/59926, retrieved from the internet Aug. 6, 2012.
http://vancouver.ca/bylaws/2849c.pdf, Street and Traffic By-Law No. 2849, Oct. 18, 2011, 92 pages.
http://parkitnyc.com/parking-nyc/nyc-parking-tickets/, retrieved from the internet Aug. 6, 2012, 3 pages.
Agarwal et al., "Learning to detect objects in images via a sparse, part-based representation", Pattern Analysis and Machine Intelligence, IEEE Transactions on, vol. 26, No. 11, p. 1-16, Nov. 2004.
Tsai et al., "Vehicle Detection Using Normalized Color and Edge Map," Image Processing, IEEE Transactions on, vol. 16, No. 3, pp. 850-864, Mar. 2007.
Duncan, et al., "Temporal edges: The detection of motion and the computation of optical flow", in Proc. Second Int. Conf. Comput. Vision, Tampa, FL, Dec. 1988, pp. 374-382.
Comaniciu et al., "Real-time tracking of non-rigid objects using mean shift", in: Proceedings of IEEE Conference on Computer Vision and Pattern Recognition (CVPR'00), South Carolina, 2000, p. 1-8.
Kass et al., "Snakes: Active Contour Models", Int'l Journal of Computer Vision, pp. 321,331, 1988.
Dickmanns et al., "Dynamic monocular machine vision", Machine Vision and Applications, p. 223-240, 1988.
Gustafsson et al., "Particle Filters for Positioning, Navigation and Tracking", IEEE Transactions on Signal Processing, 2002, p. 1-13.
Ma et al., "Edge-based rich representation for vehicle classification", Proc. of IEEE Computer Vision (ICCV), 2005, 8 pages.
http://warondriving.com/post/9215745267/los-angeles-stop-sign-cameras, "War on Driving", 9 pages, Aug. 21, 2011.
http://www.thenewspaper.com/news/17/1742.asp, "Stop Sign Ticket Cameras Developed", May 9, 2007, 1 pg.
Lowe, "Distinctive Image Features from Scale-Invariant Keypoints", International Journal of Computer Visions, 2004, pp. 1-28.
Lucas et al., "An Iterative Image Registration Technique with an Application to Stereo Vision", pp. 674-679.
Matas et al., "Robust Wide Baseline Stereo From Maximally Stable External Regions", BMVC, 2002, pp. 384-393.
Black et al., "A Model for the Detection of Motion over Time", Proceedings of the International Conference on Computer Vision, Osaka, JP, Dec. 1990, 5 pages.
Harris et al., "A Combined Corner and Edge Detector", Plessey Research Roke Manor, UK, The Plessey Company plc., 1988, pp. 147-152.
Bay et al., "SURF: Speeded Up Robust Features", pp. 1-14, 2006, https://lirias.kuleuven.be/bitstream/123456789/71383/1/Bay_Tuytelaars_VanGool-surf-eccv06.pdf.
Wiegand et al., "Overview of the H.264/AVC Video Coding Standard", IEEE, Jul. 2003, p. 260-576.
U.S. Appl. No. 13/836,310, filed Mar. 15, 2013, Wu et al.
U.S. Appl. No. 13/835,386, filed Mar. 15, 2013, Bulan et al.
http://www.osilaserscan.com/Products/Vehicle-Detection-and-Classification.aspx, 1 page.
http://www.nyc.gov/html/dof/html/parking/violation_codes.shtml, 4 pages.
http://www.nyc.gov/html/dot/html/motorist/truckrouting.shtml, 2 pages.
Lima et al., "High Definition Video Broadcast Over Core IP Networks", Sprint-Nextel, 1 Adrian Court, Burlingame, CA 94010, USA, 11 pages.
Iain E. Richardson, "The H.264 Advanced Video Compression Standard".
B. K. P. Horn and B. G. Schunck, "Determining Optical Flow," Artificial Intelligence 17 (1981), pp. 185-203.
Y. W. Huang et al., "Survey on Block Matching Motion Estimation Algorithms and Architectures with New Results," Journal of VLSI Signal Processing Systems 42, Manufactured in The Netherlands, copyright 2006, Springer Science + Business Media, Inc., pp. 297-320.
Z. Zhang, "A Flexible New Technique for Camera Calibration," IEEE Transactions on Pattern Analysis and Machine Intelligence, vol. 22, No. 11, Nov. 2000, pp. 1330-1334.
http://ladot.lacity.org/tf_Trucks_on_Residential_Streets.htm, 1 page.
http://vatruckweb.vdot.virginia.gov/VaTruckRestrictions.aspx, 1 page.
http://www.cotrip.org/roadConditions.htm, 1 page.
U.S. Appl. No. 13/613,174, filed Sep. 13, 2012, Bernal et al.
http://streetsmarttechnology.com, 2 pages, copyright 2011.
http://www.alibaba.com/product-gs/373281312/Ultrasonic_Parking_Sensor.html, 3 pages, copyright 1999-2013.
http://en.wikipedia.org/wiki/Hough_transform; 10 pages, Jan. 9, 2013.
http://www.cs.brown.edu/~pff/latent/, version 5, Sep. 5, 2012, 3 pages (http:people.cs.uchicago.edu/~rbg/latent/).
N. Dalal and B. Triggs "Histograms of Oriented Gradients for Human Detection", in 2005, CVPR, 8 pages.
T. Ojala, M. Pietikainen, and D. Harwood, "A Comparative Study of Texture Measures With Classification Based on Feature Distributions", 1996 Pattern Recognition, vol. 29, pp. 51-59, Department of Electrical Engineering, Oulu, Finland.
U.S. Appl. No. 13/441,294, filed Apr. 6, 2012, Bernal et al.
U.S. Appl. No. 13/441,253, filed Apr. 6, 2012, Bulan et al.
U.S. Appl. No. 13/441,269, filed Apr. 6, 2012, Bulan et al.
U.S. Appl. No. 13/461,191, filed May 1, 2012, Fan et al.
U.S. Appl. No. 13/684,817, filed Nov. 26, 2012, Rong et al.
M. Nilsson, J. Nordberg, and I. Claesson, "Face Detection Using Local Smqt Features and Split Up Snow Classifier", IEEE International Conference on Acoustics, Speech, and Signal Processing, 2007, Blekinge Institute of Technology, Ronneby, Sweden, pp. II-589 to II-592.
F. Perronnin and C. Dance, "Fisher Kernels on Visual Vocabularies for Image Categorization", CVPR, 2007, Xerox Research Centre Europe, Meylan, France, 8 pages.
G. Csurka, C. Dance, J. Willamowski, L. Fan and C. Bray, "Visual Categorization With Bags of Keypoints", ECCV SLCV, 2004, 16 pages.

(56) References Cited

OTHER PUBLICATIONS

F. Perronnin, J. Sanchez and T. Mensink, "Improving the Fisher Kernel for Large-Scale Image Classification", ECCV, 2010, Xerox Research Centre Europe, 14 pages.

A. Neubeck and L. V. Gool, "Efficient Non-Maximum Suppression", ICPR, 2006, Computer Vision Lab, Zurich, Switzerland, 6 pages.

P. Felzenszwalb, R. Girshick, D. McAllester, D. Ramanan, "Object Detection With Discriminatively Trained Part-Based Models," IEEE Transactions on Pattern Analysis and Machine Intelligence, vol. 32, No. 9, Sep. 2010, pp. 1627-1645.

Constantine Papageorgiou and Tomaso Poggio, "A Trainable System for Object Detection", International Journal of Computer Vision, 38(1), pp. 15-33, 2000, Netherlands.

* cited by examiner

METHOD AND SYSTEMS OF CLASSIFYING A VEHICLE USING MOTION VECTORS

CROSS REFERENCE TO RELATED PATENTS AND APPLICATIONS

U.S. patent application Ser. No. 13/277,719, filed Oct. 20, 2011 by Bulan et al. and entitled "SYSTEM AND METHOD OF SELECTIVE VIDEO FRAME COMPRESSION AND DECOMPRESSION FOR EFFICIENT EVENT-DRIVEN SEARCHING IN LARGE DATABASES" and U.S. patent application Ser. No. 13/613,174, filed Sep. 13, 2012 by Bernal et al. and entitled "METHOD FOR STOP SIGN LAW ENFORCEMENT USING MOTION VECTORS IN VIDEO STREAMS", are incorporated herein by reference in their entirety.

BACKGROUND

Automated vehicle detection, counting and classification are important tools that are widely used by traffic planners. It helps local governments determine critical traffic flow time periods, maintenance schedules and optimal traffic enforcement time period, as well as enforcement of motor vehicle laws and regulations. These tools also aid incident detection, verification and response.

Conventional vehicle classification systems are based on laser scanners and in-ground sensors, which are typically used at toll booths for electronic toll collection, see http://www.osilaserscan.com/Products/Vehicle-Detection-and-Classification.aspx. These systems gather detailed information regarding a vehicle, such as its axle number, height, width, weight, length, profile, volume, etc., and determine the amount to charge the vehicle based on the acquired information. While these systems have high accuracy and precision, they are expensive to install/maintain and are not easily scalable to other applications, such as monitoring streets/bridges in a city. Consider that states and local municipalities have numerous ordinances that restrict trucks and buses of a certain size on particular roads. Automated enforcement via video imaging requires only a coarse vehicle classification to distinguish trucks or buses from other types of vehicles. Provided herein is a relatively low-cost and computationally efficient video-based solution for vehicle classification that may meet the requirements for traffic law enforcement in some jurisdictions.

INCORPORATION BY REFERENCE http://www.osilaserscan.com/Products/Vehicle-Detection-and-Classification.aspx, 1 page;
http://www.nyc.gov/html/dof/html/parking/violation_codes.shtml, 4 pages;
http://www.nyc.gov/html/dot/html/motorist/truckrouting.shtml, 2 pages;
"
"The H.264 Advanced Video Compression Standard," Iain E. Richardson;
"Determining Optical Flow," B. K. P. Horn and B. G. Schunck, Artificial Intelligence 17 (1981), pages 185-203;
"Survey on Block Matching Motion Estimation Algorithms and Architectures with New Results," Y. W. Huang et al., Journal of VLSI Signal Processing Systems 42, Manufactured in The Netherlands, copyright 2006, Springer Science+Business Media, Inc., pages 297-320;
Z. Zhang, "A Flexible New Technique For Camera Calibration," IEEE Transactions On Pattern Analysis and Machine Intelligence, Volume 22, No. 11, November, 2000, pages 1330-1334;
http://ladot.lacity.org/tf_Trucks_on_Residential_Streets.htm, 1 page;
http://vatruckweb.vdot.virginia.gov/VaTruckRestrictions.aspx, 1 page; and
http://www.cotrip.org/roadConditions.htm, 1 page, are all incorporated herein by reference in their entirety.

BRIEF DESCRIPTION

In one embodiment of this disclosure, described is a computer implemented method of classifying a vehicle captured with an image capturing device, the image capturing device oriented to include a field of view spanning a vehicle detection target region, the method comprising a) generating a cluster of motion vectors representative of a vehicle detected within the target region; b) associating one or more attributes with the cluster of motion vectors; and c) classifying the vehicle detected according to the one or more attributes associated with the cluster of motion vectors.

In another embodiment of this disclosure, described is an image capturing system for classifying a vehicle captured by the image capturing system, the image capturing system comprising an image capturing device oriented to include a field of view spanning a vehicle detection target region; and an image processor operatively associated with the image capturing device, the image processor configured to perform a method of classifying a vehicle captured with the image capturing device comprising a) generating a cluster of motion vectors representative of a vehicle detected within the target region; b) associating one or more attributes with the cluster of motion vectors; and c) classifying the vehicle detected according to the one or more attributes associated with the cluster of motion vectors.

In yet another embodiment of this disclosure, described is a computer implemented method of classifying a vehicle captured with an image capturing device, the image capturing device associated with a field of view including a vehicle detection target region: a) extracting a cluster of motion vectors representative of a vehicle detected within the target region; b) associating one or more attributes with the cluster of motion vectors; and c) classifying the vehicle detected according to the one or more attributes associated with the cluster of motion vectors.

In still another embodiment of this disclosure, described is an image processing system for classifying a vehicle captured with an image capturing device, the image processing system comprising an image processor configured to perform a method comprising a) extracting a cluster of motion vectors representative of a vehicle detected within a target region associated with the image capturing device; b) associating one or more attributes with the cluster of motion vectors; and c) classifying the vehicle detected according to the one or more attributes associated with the cluster of motion vectors.

BRIEF DESCRIPTION OF THE DRAWINGS

FIG. 5 illustrates a reference frame including a reference block and a search window and FIG. 6 illustrates a target frame including a target block, i.e. motion block;

FIG. 7 is a reference frame, FIG. 8 is a target frame, FIG. 9 is a resulting motion vector field, and FIG. 10 is a predicted frame;

FIG. 11 is a reference frame; FIG. 12 is a target frame; FIG. 13 is a resulting motion vector field; and FIG. 14 is a resulting binary image showing active motion blocks;

DETAILED DESCRIPTION

Figure 1:
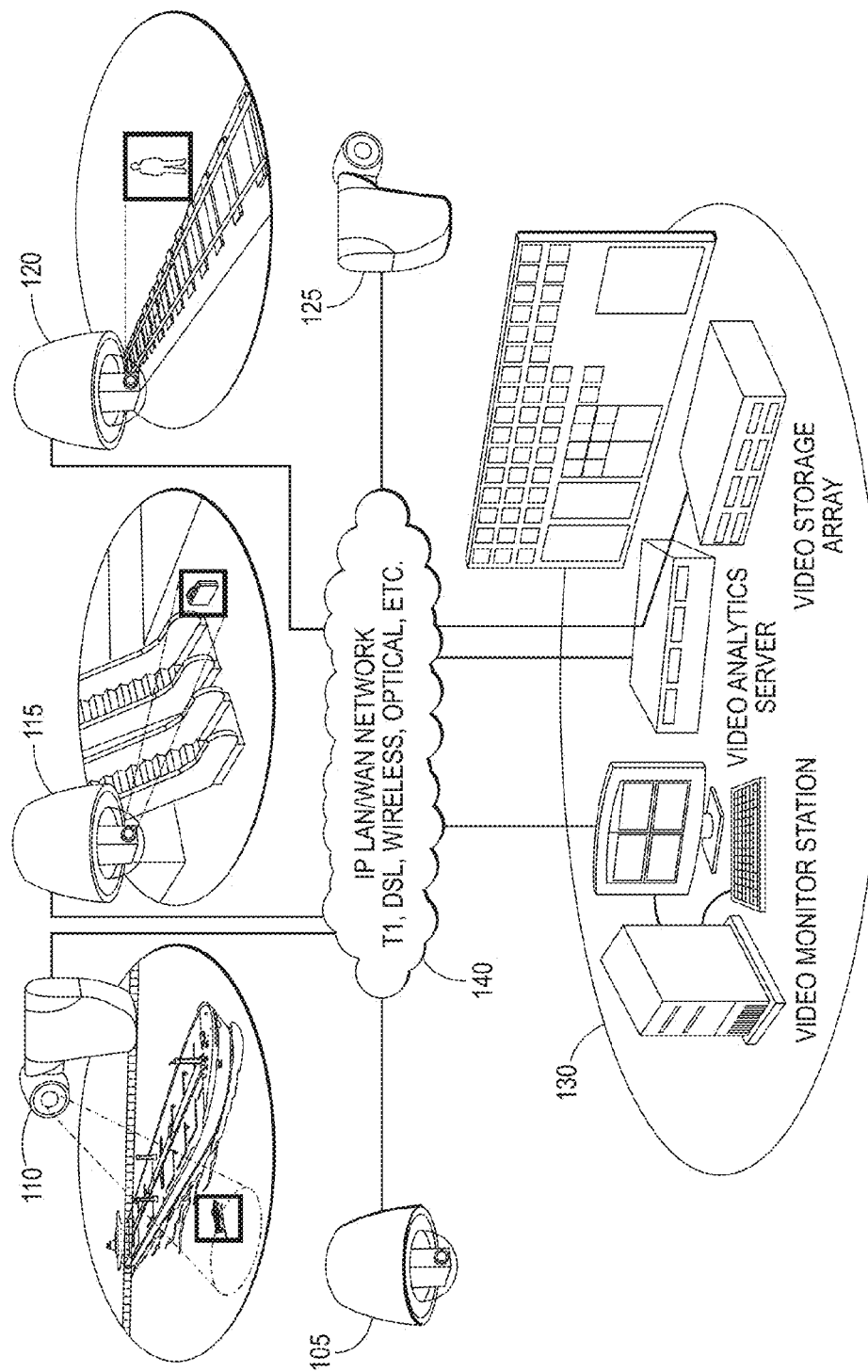
FIG. 1 illustrates a video camera network system.

For purposes of this disclosure, the term "vehicle" is defined as a thing used for transporting people or goods, such a car, truck, motorcycle, The present disclosure provides methods and systems for automated video-based vehicle classification that can operate within a compression video stream, which includes the following steps: (a) during an initialization step, determine the location of a virtual target area within a camera's field of view spanning a region of interest, typically performed at system installation or setup, the target area defining the location within the captured image where the vehicle detection and classification is to be performed; (b) capture video using the camera or alternatively, read-in compressed video that was previously captured with the camera; (c) determine motion vectors from the incoming, live uncompressed video stream, where the vectors are the type used for video compression or alternatively, if processing already compressed video, extract motion vectors from the compressed data stream; (e) detect the presence of a vehicle that moves across a virtual target area by analyzing the temporal persistence of clusters of motion vectors from step (c); (f) classify the detected vehicle into one of a truck/bus or other passenger vehicle categories, by analysis of a cluster of motion vectors associated with the detected vehicle. The relevant information about the vehicle class may be embedded in the compressed video stream in the form of metadata; and (g) (optional) frames in which a vehicle is within the field of view of the camera can be encoded as reference (I-) frames to facilitate future searches. Notably, building the vehicle classification directly into the compression allows for embedding the classification process directly within the camera.

Video monitoring in transportation settings is a rapidly expanding field. Key problems encountered in implementing video services are the data transmission bandwidth, data processing burden, and data storage capacity.

As briefly discussed in the background section, traditional vehicle classification systems are based on laser scanners and in-ground sensors, which are typically used at toll booths for electronic toll collection, see http://www.osilaserscan.com/Products/Vehicle-Detection-and-Classification.aspx. These systems gather detailed information regarding a vehicle such as its axle number, height, width, weight, length, profile, volume etc. and determine the amount to charge the vehicle based on the gathered information. While they may have high accuracy, these systems are expensive to install/maintain and their use is not easily extendable to streets/bridges in a city. At the same time, automated enforcement of several traffic regulations could benefit from systems that perform coarse vehicle classification to distinguish trucks or buses from other types of vehicles.

Below are listed several regulations in different cities where trucks are not allowed in certain locations of the city. These regulations are typically indicated by traffic signs, which may read "No Trucks", etc.

Trucks exceeding 22 feet are prohibited by law to park in residential areas in Los Angeles, see http://www.osilaserscan.com/Products/Vehicle-Detection-and-Classification. aspx.

Trucks in New York City have to follow certain routes designated for trucks. For example, a truck trip that starts in Staten Island and ends in Queens is required to use the Through Route Network while passing through the borough of Brooklyn en route to Queens, see http://www.nyc.gov/html/dot/html/motorist/truckrouting.shtml.

In the state of Virginia, the roads/highways are color-mapped to show restricted areas for trucks exceeding 65 ft. and vehicles exceeding 35 ft., see http://vatruckweb.vdot.virginia.gov/VaTruckRestrictions.aspx.

Similar regulations can also be found in the legislations of other states and cities. For example, one regulation common to many cities restricts/prohibits passenger cars from using bus lanes other than for making a right turn, see http://www.nyc.gov/html/dof/html/parking/park_tickets_violations. shtm. Fines for infractions of these regulations may be within the range of several hundred dollars depending on the type and location of the violation.

An automated solution for enforcing the above-described regulations requires vehicle classification to distinguish buses or trucks of a certain size from other type of vehicles. The methods and systems provided herein enable a relatively low-cost and computationally efficient video-based solution. In addition, use of the provided video-based solution may increase the revenue of municipalities by increasing the detection of violators, while decreasing cost to those municipalities by reducing the labor currently used in detecting these traffic infractions.

Besides being relatively low-cost and computationally efficient, another potential benefit of the provided methods and systems over those based on laser scanners is its scalability and compatibility with existing infrastructures. Due to the ubiquity of video cameras which are broadly used in surveillance, security and transportation applications, the algorithms provided herein can be integrated into existing video cameras whenever convenient. In the state of Colorado, for example, thousands of video cameras are already operating to check road conditions in highways in real time, see http://www.cotrip.org/roadConditions.htm, and integrating the algorithms provided herein in these cameras will add value to these cameras and increase the revenue of the state by reducing missed fines.

Note that the presently taught methods and systems of this disclosure focus on the detection of violators of motor laws and/or regulations associated with the classification of a vehicle. Actual law enforcement requires several additional considerations. For example, automated issuing of tickets requires vehicle identification, which can be achieved with LPR (License Plate Recognition) commonly used in numerous transportation imaging applications related to enforcement for red lights, speed, parking, etc. Another use of the present detection method and systems include alerting local law enforcement to stop the identified vehicle. Yet another use is monitoring traffic conditions so that trends of a particular violation can be detected and suitable signage or enforcement capabilities can be implemented. Another use is the acquisition of traffic statistics, which are used by highway departments for applications such as routing, traffic signal optimization, understanding needed road repairs as a function of traffic flow, and the like. An advantage of the present method is that it can simply be integrated as an additional feature in existing transportation cameras.

The following description focuses on methods and/or systems of classifying a vehicle captured with an image capturing device. As discussed above, the classification of a vehicle detected as a truck, bus, passenger vehicle, etc. enables further processing to provide enforcement of laws and/or regulations related to types of vehicles, as well as the gathering of traffic flow statistics.

It is to be understood that while the exemplary embodiments described below utilize motion vectors and/or blocks associated with a video compression process to classify a vehicle, other motion vector types unrelated to video compression may be used and are within the scope of this disclosure. In addition, while the exemplary embodiments are directed to a video based system for capturing vehicles within a target region, such as a particular road way, various multi-image frame capturing systems may be utilized and are within the scope of this disclosure. Some examples of video, or multi-image frame capturing systems, include RGB cameras, infrared camera systems, thermal camera systems and satellite imaging camera systems.

Video compression is essential in applications where high quality video transmission and/or archival is required. Consider the surveillance system depicted in FIG. 1 which is composed of a set of dome cameras 105, 110, 115, 120 and 125 that relay video data to a central processing and archival facility 130. While the communication network 140 used to transport the video stream between the cameras and the central facility may be built on top of proprietary technology, traffic management centers have recently started to migrate to Internet Protocol- or IP-compliant networks.

Whichever is the case, the underlying communication network typically has bandwidth constraints which dictate the use of video compression techniques on the camera end, prior to transmission. In the case of legacy analog cameras, compression is performed a an external encoder attached to the camera, whereas digital cameras typically integrate the encoder within the camera itself. Typical transmission rates over IP networks require the frame rate of multi-megapixel video streams to be limited to fewer than 5 frames per second (fps). The latest video compression standards enable the utilization of the full frame rate camera capabilities for transmitting high definition video at the same network bandwidth, see "High Definition Video Broadcast Over Core IP Networks", Claudio R. Lima et al., Sprint-Nextel, 1 Adrian Court, Burlingame, Calif. 94010, USA, 11 pages. For example, transmission of 1080p HD uncompressed video requires a bandwidth of 1.5 Gbps, while its compressed counterpart requires only 250 Mbps; consequently, transmission of compressed video with 6 times the frame rate of the uncompressed version would be possible over the same network infrastructure.

Figure 2:
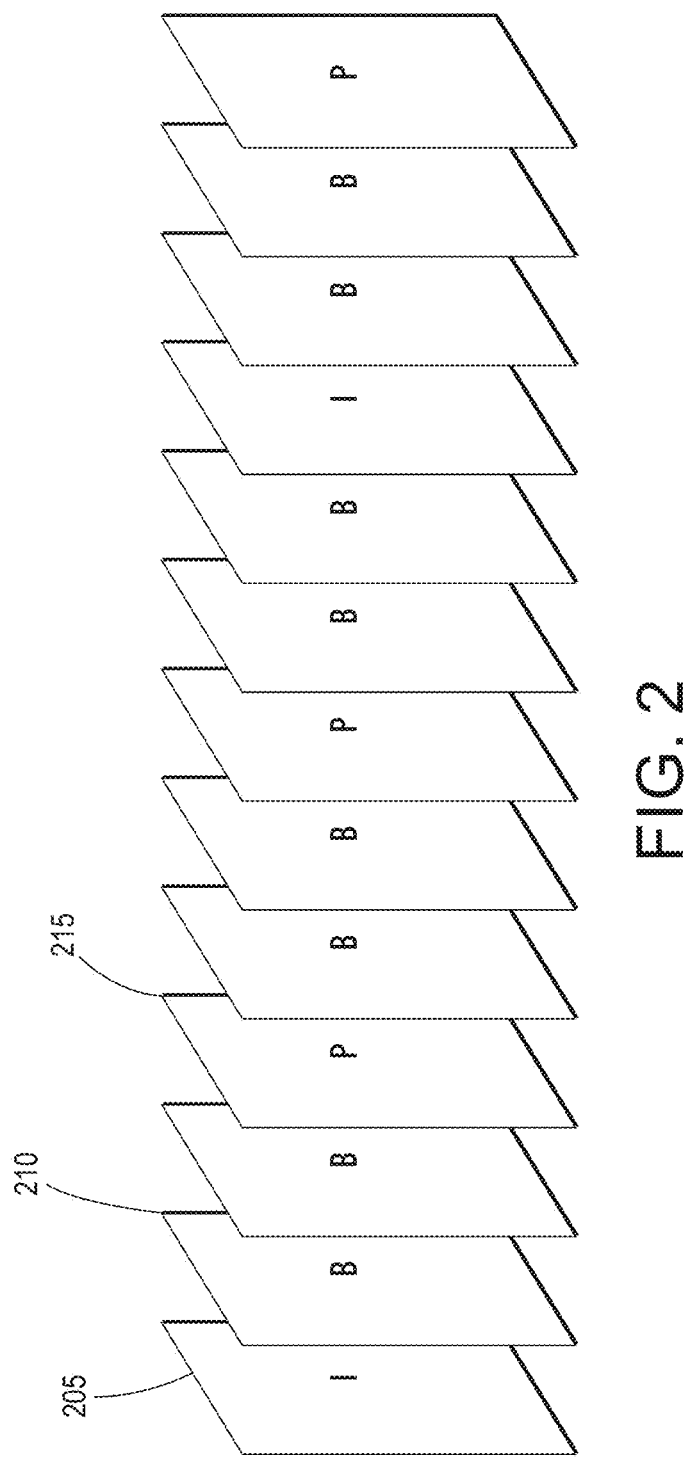
FIG. 2 is a schematic diagram of a video compression technique used according to an exemplary embodiment of this disclosure, the diagram showing reference (I) and non-reference (P and B) frames.

Video compression is achieved by exploiting two types of redundancies within the video stream: spatial redundancies amongst neighboring pixels within a frame, and temporal redundancies between adjacent frames. This modus operandi gives raise to two different types of prediction, namely intra-frame and inter-frame prediction, which in turn result in two different types of encoded frames, reference and non-reference frames, as depicted in FIG. 2. Reference frames, or I-frames 205 are encoded in a standalone manner (intra-frame) using compression methods similar to those used to compress digital images. Compression of non-reference frames, i.e. P-frame 215 and B-frame 210, entails using inter-frame or motion-compensated prediction methods where the target frame is estimated or predicted from previously encoded frames in a process that typically includes the following three steps:

(i) motion estimation, where motion vectors are estimated using previously encoded frames. The target frame is segmented into pixel blocks called target blocks, and an estimated or predicted frame is built by stitching together the blocks from previously encoded frames that best match the target blocks. Motion vectors describe the relative displacement between the location of the original blocks in the reference frames and their location in the predicted frame. While motion compensation of P-frames relies only on previous frames, previous and future frames are typically used to predict B-frames;

(ii) residual calculation, where the error between the predicted and target frame is calculated; and (iii) compression, where the error residual and the extracted motion vectors are compressed and stored, see "The H.264 Advanced Video Compression Standard," Iain E. Richardson.

For video captured with a stationary camera—the configuration of most traffic cameras currently deployed-, the main cause of changes between adjacent frames corresponds to object motion. In this setting, the output from the motion compensation stage is an optical block flow describing the way pixel blocks move between adjacent frames. As such, the encoded set of motion vectors is a good descriptor of apparent motion of objects within a field of view associated with the stationary camera.

As previously stated, the presently disclosed vehicle classification method is described as using compression-type motion vectors, however, the method generally applies to other types of motion vectors as well. The focus of the detailed discussion on compressing type vectors is due to the important bandwidth benefits associated with video compression.

The present disclosure provides a method and system for automated video-based vehicle classification that can operate within a compression video stream. Exemplary embodiments use motion vectors associated with video compression, which are calculated as one of the compression steps prior to archiving or transmission, or are readily available from the compressed data stream. Building the vehicle classification directly on top of the compression pipeline adds a small amount of computation which is conducive to real-time performance. This embedded embodiment of the classification process negates the need for further processing at the server, such as decompression, vehicle classification and recompression. In another embodiment, the classification process is implemented in a central processor that has access to the compressed video data. According to this embodiment, vehicle classification is enabled by decompression of only the motion vectors, rather than decompression of the complete video.

One advantage of the disclosed classification process concerns bandwidth savings, which is achieved when vehicle classification is performed at or near the video camera, rather than at a central server. For this configuration, bandwidth can be reduced by only transmitting images of interest to the central location for archival and evidentiary use. For example, only transmitting images of trucks, buses or other passenger vehicles. Alternatively, video frames containing vehicles of interest may be encoded as reference frames to facilitate future video searches in case the full video feed is transmitted and stored. Another alternative is transmission of the classification result with our without the corresponding video, which can be sufficient in traffic analysis applications.

Figure 3:
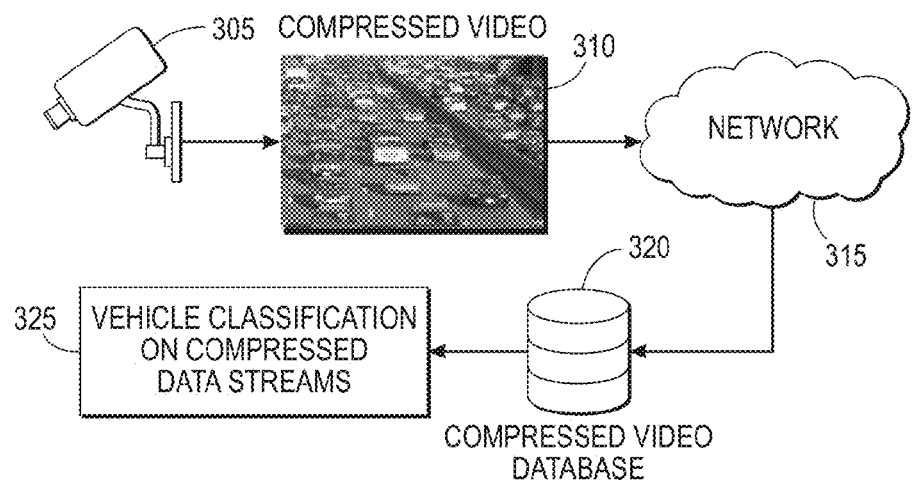
FIG. 3 is a schematic of an image capturing system incorporating an offline vehicle classification process utilizing motion vectors according to an exemplary embodiment of this disclosure.
Figure 4:
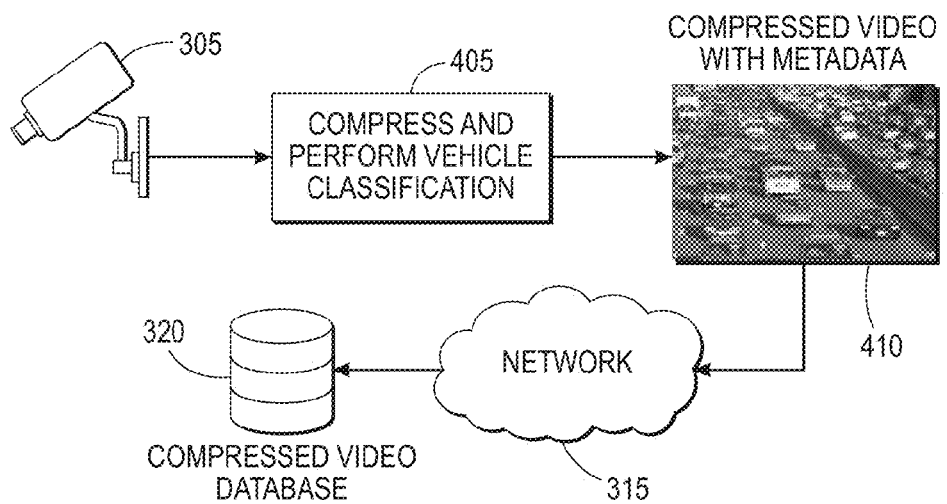
FIG. 4 is a schematic of an image capturing system incorporating an inline vehicle classification process utilizing motion vectors according to an exemplary embodiment of this disclosure.

A high-level overview of two exemplary embodiments of the present disclosure is shown in FIGS. 3 and 4. Initially, a traffic surveillance camera 305 captures video of the region of interest, typically a street, highway or vehicle entrance or exit.

With reference to FIG. 4, vehicle classification is performed as a minor addition to the video compression procedure as explained in more detail below. According to one exemplary embodiment, as a vehicle passes through the street and is classified, the information regarding the vehicle class is embedded in the compressed video stream in the form of metadata. Optionally, frames in which a vehicle is within the field of view of the camera can be encoded as reference frames to facilitate future searches.

The steps involved in the implementation of the algorithm are:

a) During an initialization step, determine the location of a virtual target area within a camera's field of view spanning a region of interest, the target area defining the location within the captured image where the vehicle detection and classification is to be performed. This step is typically performed at system installation or setup;

b) Capture video using the camera 305. Alternatively, acquire compressed video that was taken with the camera;

c) Determine motion vectors from the incoming, live uncompressed video stream 405, where the vectors are the type that will be used for video compression. Alternatively, if compressed video had previously been read-in, extract motion vectors from the compressed data stream (See FIG. 3);

d) Detect the presence of a vehicle that moves across the virtual target area by using the motion vectors from step c;

e) If a moving vehicle is detected in the virtual target area, classify the detected vehicle into one of truck/bus or other passenger vehicle categories. The vehicle class may be embedded in the compressed video stream in the form of metadata; and f) (Optional) Frames in which a vehicle is within the field of view of the camera at an optimal location, relative to the specific application, can be encoded as reference frames to facilitate future searches or rapid retrieval of evidentiary imagery;

Classification of detected vehicles can be implemented in one or more of several possible ways, including the following:

(1) Based on the geometric attributes (e.g., area, length, height, width, eccentricity, combinations thereof, etc.) of a cluster of detected motion blocks associated with a detected vehicle on the image plane. For example, the area, length, height, width, eccentricity, combinations thereof, etc. associated with a cluster of detected motion blocks; and/or (2) Estimating the physical length and/or width of the detected vehicle by using a camera calibration technique which maps pixel coordinates to real-world length units.

Since the procedure relies on the processing of information conveyed by motion vectors, the method can alternatively be executed on already compressed video streams without the need to decompress the video, as shown in FIG. 3, making the classification process more computationally efficient than the naïve approach, which performs complex operations such as background estimation, motion detection, tracking, feature extraction etc. on a fully decompressed video stream. Furthermore, the disclosed vehicle classification method can also be useful in the processing of stored video that was previously compressed for use in historical data analysis.

The following detailed description provides further details of the method steps outlined above for classifying a vehicle according to exemplary embodiments of this disclosure.

Implementation of the disclosed vehicle classification methods may only require minor additional processing with respect to the video compression algorithm at the point of execution, be it the analog to digital converter in the case of analog cameras or the camera itself in the case of digital or IP cameras.

a) During an initialization step, determine the location of a virtual target area within a camera's field of view spanning a region of interest.

Typical virtual target areas include, but are not limited to single or multiple virtual polygons, usually one per monitored traffic lane. The location of the virtual target areas may be input manually as it depends on the geometric configuration of the specific camera setup. The virtual polygon is used for both occlusion and vehicle detection.

b) Capture video using the camera. Alternatively, read-in compressed video previously acquired with the camera.

A conventional traffic camera or other video camera may be used for capturing live video. Implementation of the disclosure requires fewer modifications on IP cameras that perform embedded video compression. Alternatively, the compressed video may be available from a video data base.

c) Determine motion vectors from the incoming, live uncompressed video stream, where the vectors are the type that will be used for video compression. Alternatively, extract motion vectors from the previously acquired compressed data stream.

Standard implementations of video compression algorithms usually utilize fixed rates for reference or I-frame inclusion, typically on the order of one I-frame every 30 to 50 frames. Since I-frames don't have associated motion vectors, they aren't utilized for monitoring and detection purposes. Exclusion of I-frame processing does not have a significant effect on vehicle detection because they represent a small minority of frames.

Motion vectors are extracted as part of the motion estimation stage in the compression process. While motion vectors comprehending the full video frame are computed at compression, it should be clear from the description of subsequent steps that processing of motion vectors located within the confines of the virtual target area is sufficient for robust monitoring of stoppage events. The following is a brief description on how motion vectors are extracted, see "The H.264 Advanced Video Compression Standard," Iain E. Richardson.

Figure 5:
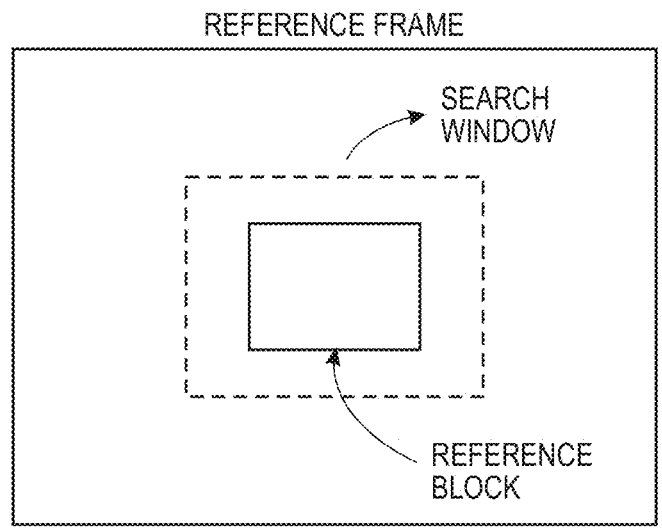
FIGS. 5 and 6 illustrate a block matching algorithm performed according to an exemplary embodiment of this disclosure.
Figure 6:
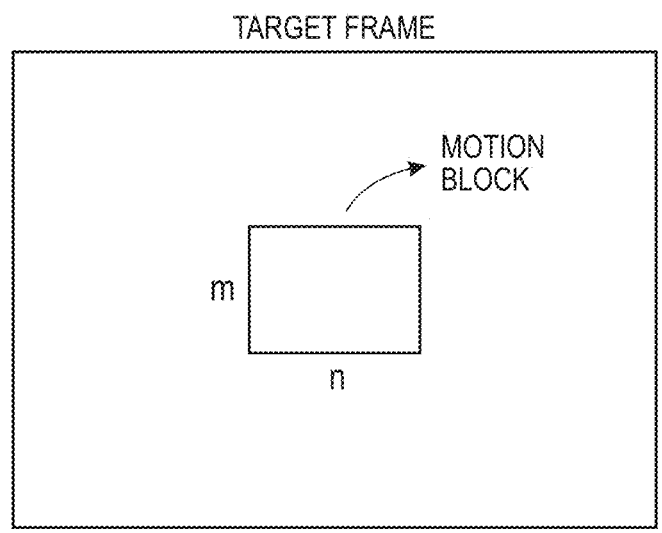

Motion vectors between two adjacent frames in a video sequence can be extracted using a pixel-level optical flow method, see "Determining Optical Flow," B. K. P. Horn and B. G. Schunck, Artificial Intelligence 17 (1981): 185-203, which entail the calculation of motion vectors for each pixel in each non-reference frame, and is thus highly computationally expensive. However, compression algorithms such as H264 and MPEG4 typically employ block-based approaches. See "The H.264 Advanced Video Compression Standard," Iain E. Richardson. Motion vectors in block-based approaches describe motion of matching blocks across adjacent frames and their computation requires significantly less computational resources when compared to pixel-level methods. FIGS. 5 and 6 depict a graphical description of a block matching algorithm.

Figure 7:
FIGS. 7, 8, 9 and 10 illustrate the results of a block-based motion estimation performed according to an exemplary embodiment of this disclosure.
Figure 8:
Figure 9:
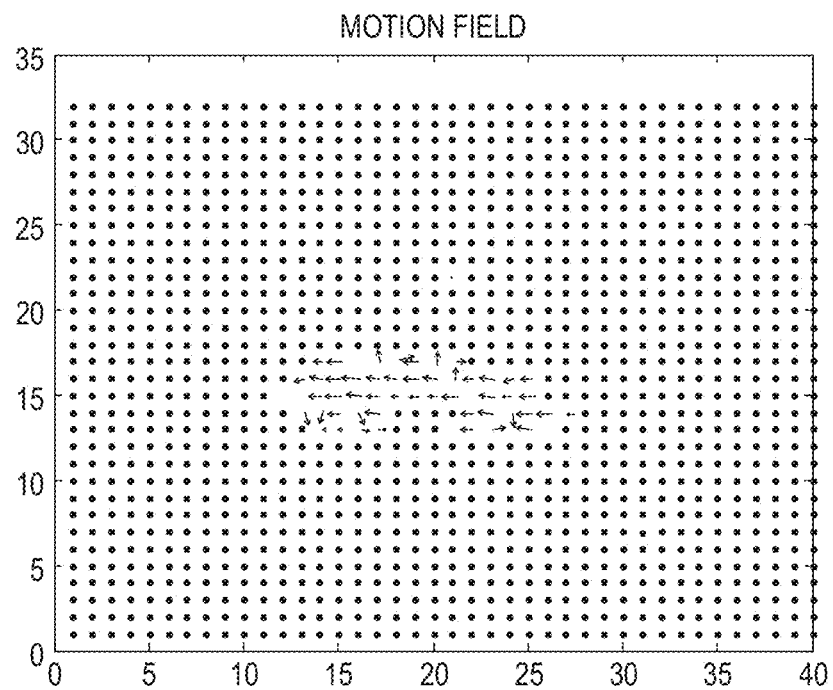
Figure 10:
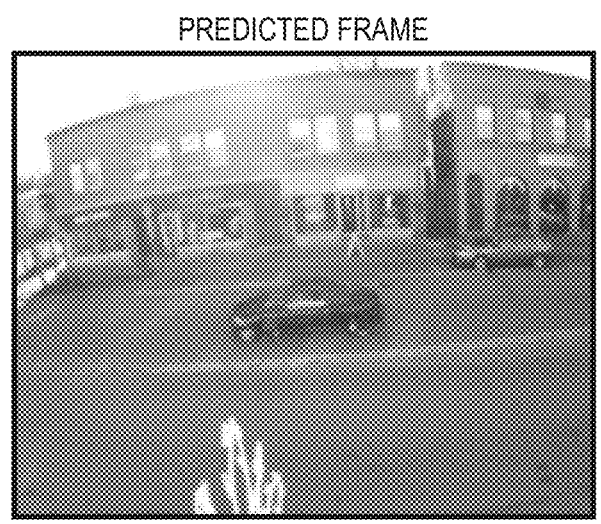
Figure 11:
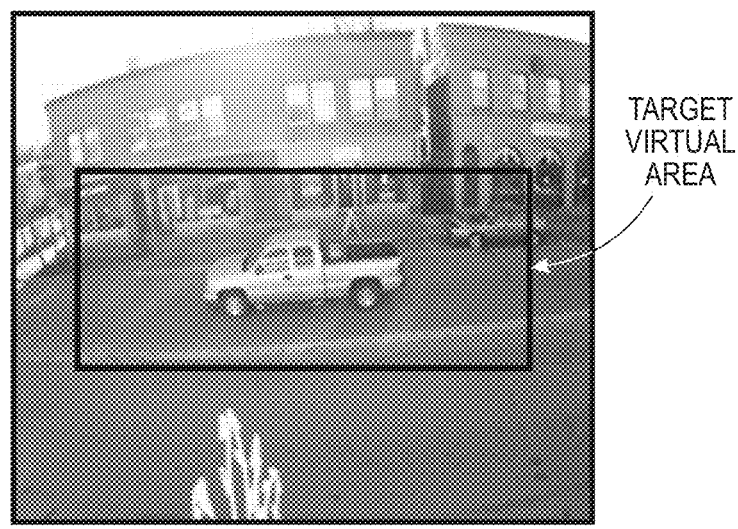
FIGS. 11, 12, 13 and 14 are another illustration of the results of a block-based motion estimation algorithm performed according to an exemplary embodiment of this disclosure.
Figure 12:
Figure 13:
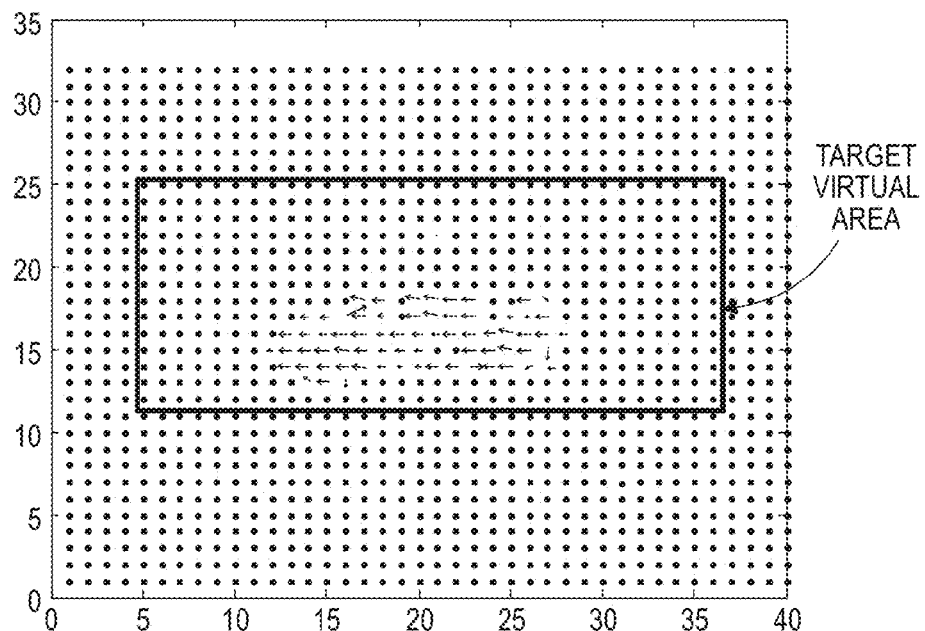
Figure 14:
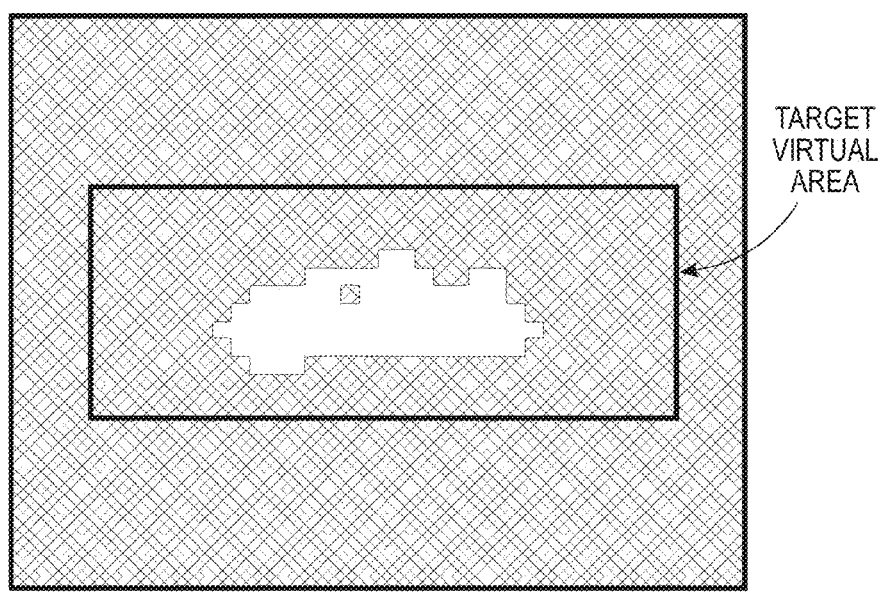
Figure 15:
FIGS. 15 and 16 are video frames including a captured truck and passenger car, respectively.
Figure 16:
Figure 17:
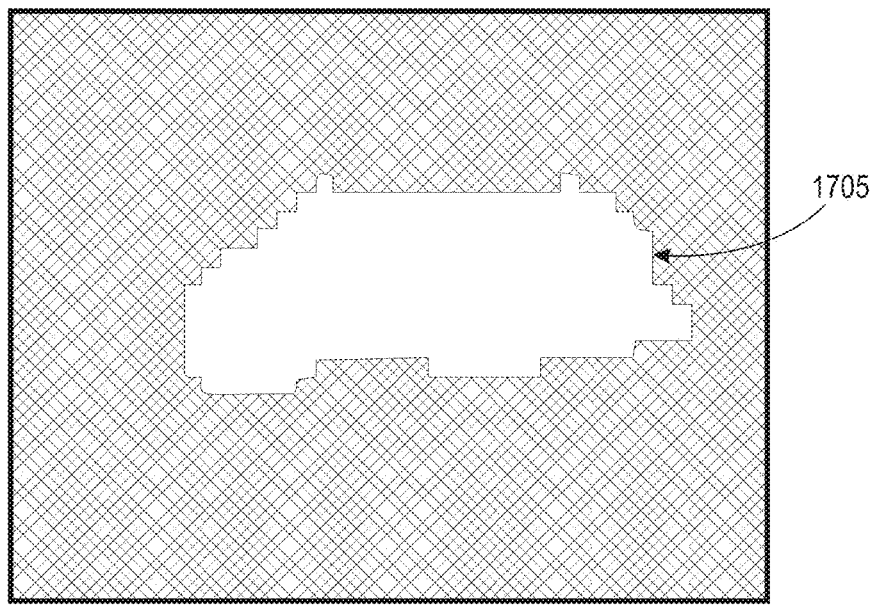
FIGS. 17 and 18 show the corresponding active motion blocks associated with FIGS. 15 and 16, respectively.
Figure 18:
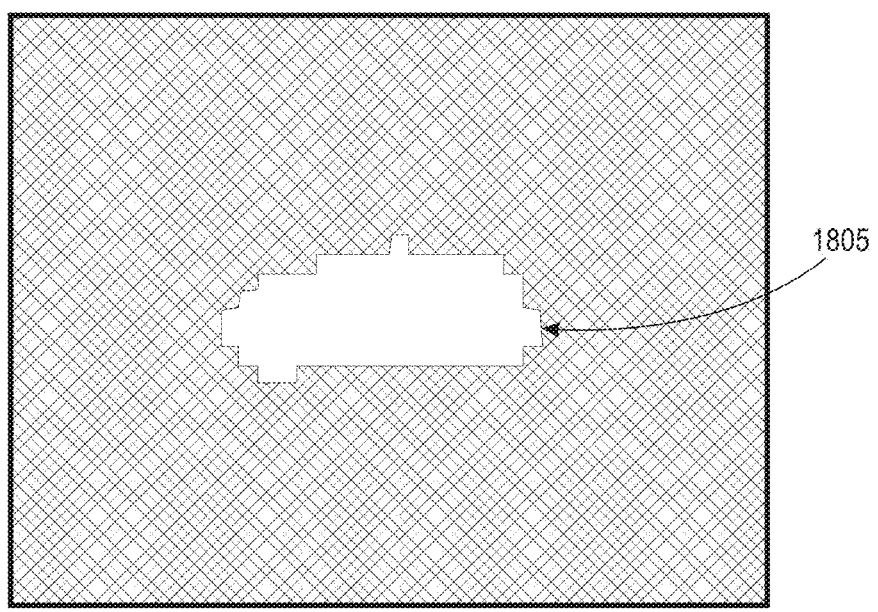

The block matching algorithm breaks up the frame to be compressed, i.e. target frame, into pixel blocks of a predetermined size, for example, denoting denote the size of a motion block by m×n pixels, where typically m=n=16 pixels. A search is performed in the reference frame for the block that is most similar to the current m×n target pixel block. Since searching and calculating similarity metrics is a computationally expensive process, a search window is typically defined around the location of the target motion block as shown in FIG. 5. Example similarity criteria between the blocks are the mean squared error (MSE) and the mean absolute difference (MAD), which are calculated as:

$$MSE(d_1,d_2)=\Sigma(B(k,l,j)-B(k+d_1,l+d_2,j-1))^2 \quad (1)$$

$$MAD(d_1,d_2)=\Sigma|B(k,l,j)-B(k+d_1,l+d_2,j-1)| \quad (2)$$

where $B(k,l,j)$ denotes the pixel located on the k-th row and l-th column of the m×n block of pixels in the j-th frame, and $(d_1,d_2)$ is the vector describing the displacement between the target and candidate blocks. In this case, the j−1-th frame is the already encoded frame being used as a reference frame, and the j-th frame is the target frame. Since both MSE and MAD measure how dissimilar two blocks are, a block similarity measure can then defined as the reciprocal or the negative MSE or MAD. The motion vector for the target pixel block is the vector $(d_1,d_2)$ that maximizes the block similarity measure between the target and reference blocks. The search for the best matching block in the search window can be conducted using full extensive search, binary search, three step search, spiral search algorithms, etc. see "Survey on Block Matching Motion Estimation Algorithms and Architectures with New Results," Y. W. Huang et al. Journal of VLSI Signal Processing Systems 42 (2006). FIG. 9 illustrates the motion field resulting from the application of an 8×8 pixel block-based motion estimation algorithm with a 16×16 pixel search to the reference frame depicted in FIG. 7 and the target frame depicted in FIG. 8. FIG. 10 shows the predicted image that results from stitching together the best-matching reference blocks. In this scenario, the camera is fixed and the car is moving right to left. As a consequence, all apparent movement is within the region where car is located on the image plane.

d) Detect the presence of a vehicle that moves across the virtual target area by using the motion vectors from c).

In order to avoid false positives due to spurious sources of motion such as camera shake, moving leaves and clouds, water waves, etc., only motion vectors with a magnitude larger than a predetermined threshold T are considered. The motion blocks associated with such motion vectors are referenced as active motion blocks and indicate the existence of a moving object in the area captured by the blocks. FIGS. 11-14 illustrate how knowledge of motion vectors for a given target frame can be used in conjunction with the location of the target virtual area in order to trigger a vehicle detection event. FIGS. 11-14 show two consecutive video frames and the corresponding motion vectors and the active motion blocks. The motion vectors are calculated for 4×4 pixel blocks. Superimposed on both figures is a sample target virtual area, a virtual polygon depicted as a rectangular box that contains the road lane being monitored.

As a vehicle moves across a virtual polygon, a number of active motion vectors will be located inside the polygon. In order to avoid false positives due to active motion vectors produced by apparent motion of objects different than the vehicles, two thresholds are set: a threshold $N_1$ which defines the smallest connected cluster of active motion vectors inside the virtual polygon before a vehicle detection is triggered, and a threshold $N_2$ which defines the smallest number of consecutive frames on which connected clusters having at least $N_1$ active motion vectors are inside the virtual polygon before a vehicle detection is triggered.

The value of $N_1$ will typically depend on the geometry of the camera setup, the size of the virtual polygon, the resolution of the video sequence as well as the size of the blocks used in the motion estimation algorithm. The value of $N_2$ will depend on the value of $N_1$, the geometry of the camera setup, the size of the virtual polygon, the frame rate and the average speed of the road being monitored. A vehicle detection event will be triggered on the $N_2$-th consecutive frame in which clusters of at least $N_1$ connected motion vectors are located inside the virtual polygon.

Once a vehicle is detected, morphological operations, such as closing, opening, filling etc., can be performed on the binary image describing the location of the active motion blocks.

e) Determine if a moving vehicle is detected in the virtual target area, and classifying the detected vehicle into one of truck/bus or other passenger vehicle categories possibly including motorcycles. The vehicle class may be embedded in the compressed video stream in the form of metadata.

Once a vehicle is detected in the region of interest, the detected vehicle is classified into one of two classes as buses/trucks or other passenger vehicle. As previously discussed, vehicle classification can be implemented in many ways. Some examples of these algorithms are listed below:

(1) Based on the geometric attributes (e.g., area, length, height, width, eccentricity, combinations thereof, etc.) of a cluster of detected motion blocks associated with a detected vehicle on the image plane; these geometric attributes can be determined directly from the shape of the cluster itself or from the shape of a primitive geometric function (e.g. ellipse) fitted to the outline of the cluster; and/or (2) Estimating the physical length of the detected vehicle can be achieved by using a camera calibration technique which maps pixel coordinates to real-world length units.

A relatively straightforward method for vehicle classification is based on the measured area of a cluster of active motion blocks. For a given camera setup geometry, the area of buses/trucks is typically much larger than the area of other passenger vehicles on the image plane, as shown in FIGS. 15-18. In these figures, the detected blob 1705 for a truck is much larger than the blob 1805 for the SUV. Based on the binary image showing the active motion blocks, the area of a detected blob S can be calculated as:

$$S = \sum_x \sum_y I(x, y)$$

where I is the frame-sized binary mask output from the preceding module and x and y are the pixel coordinates. The calculated blob area is then compared with a predetermined threshold value $T_1$ to distinguish buses/trucks from other passenger vehicles. Note that the predetermined threshold value $T_1$ depends on a specific camera configuration, geometry and parameters, such as camera resolution, and can be set at the camera installation/set-up before initializing the algorithm.

Figure 19:
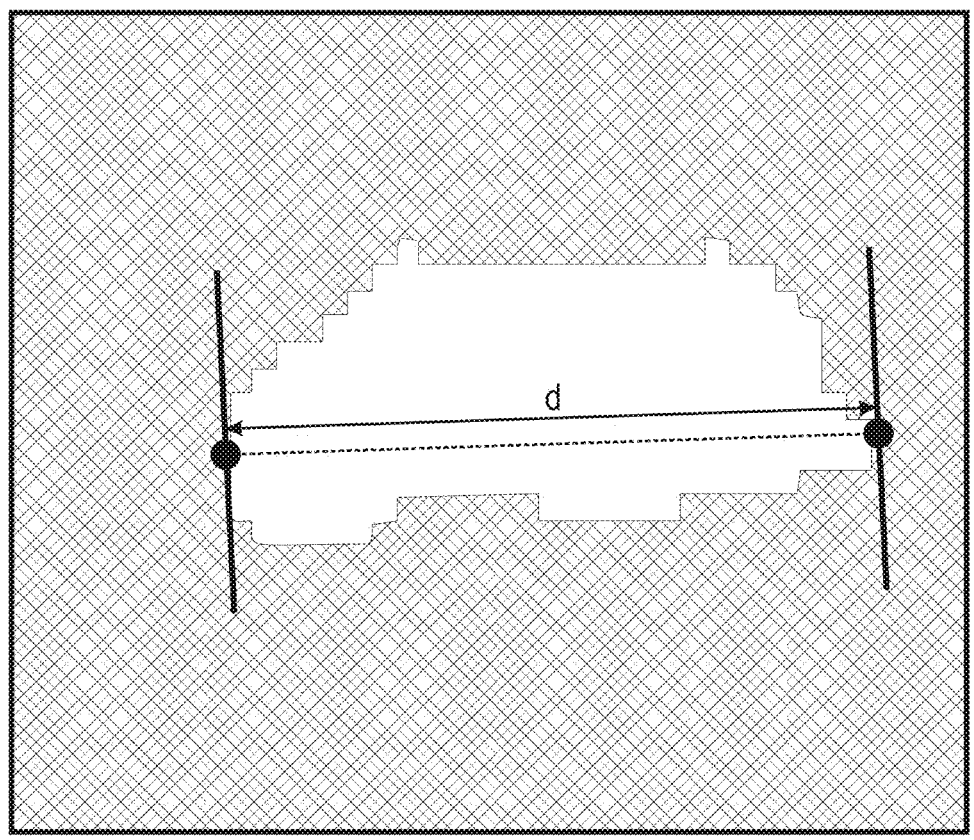
FIG. 19 illustrates one exemplary embodiment of classifying a vehicle by estimating the length of a vehicle detected in a region of interest using a cluster of active motion blocks.
Figure 20:
FIGS. 20, 21, 22 and 23 are examples of Trucks/Buses correctly classified using compression motion vectors according to an exemplary embodiment of this disclosure.
Figure 21:
Figure 22:
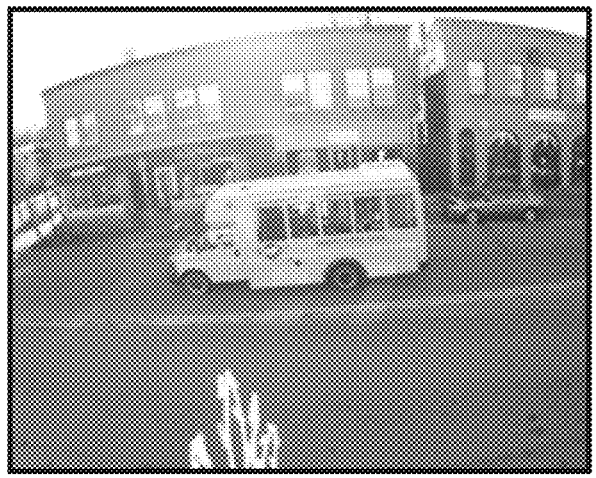
Figure 23:

Another way to perform vehicle classification is by estimating the physical length d of a detected vehicle. This can be achieved by first determining the start and end points of the cluster of active motion blocks. A line is drawn through each of the start and end point perpendicular to the street direction on the image plane. The line that joins the start and end points is then projected onto the line perpendicular to the lines that pass through the start and end points. The length of a vehicle is then estimated as the length of the projected line. This approach is illustrated in FIG. 19. The physical length of the projected line can be estimated through a calibration process, which maps pixel coordinates into real-life coordinates, see Z. Zhang, "A flexible new technique for camera calibration," IEEE Trans. On Pattern Analysis and Machine Intelligence, Vol. 22(11), 1330-1334 (2000). The estimated length d is then compared with a predefined threshold $T_2$. A vehicle is classified as a bus/truck if the estimated length is larger than the threshold. Notably, it is to be understood the above techniques used to estimate a length of a detected vehicle can also be used to estimate the width of a vehicle where the video is captured from a camera oriented directly or obliquely to the rear or front of a vehicle. The estimated width of a vehicle can then be used to provide a vehicle classification based on the relative widths of various classes of vehicles, for example a motorcycle vs. a passenger car.

Optionally, vehicle class information can be directly embedded into captured video. This provides additional computational savings as the compression standards make it possible to parse a compressed video stream without actually decoding the video/audio content. The ability to include metadata of various types is a key element in MPEG4 and H264.

f) (Optional) Frames in which a vehicle is within the field of view of the camera at an optimal location, relative to the specific application, can be encoded as reference frames to facilitate future searches or rapid retrieval of evidentiary imagery.

The video sequence or still frames within the sequence may be viewed by a person for verification of a vehicle class and this imagery may be used as legal evidence. Fast retrieval can be enabled by selecting certain frames to be I-frames. For instance, rapid decompression for viewing a video of a vehicle driving through the virtual target area may be enabled by encoding an I-frame at the time a vehicle is in the middle of the target area, or at a location where its license plate is legible.

The method provided herein was tested on a video sequence captured on a local road in Webster Village, N.Y. The video was taken with a commercially available Vivotek IP8352 surveillance camera. The video monitored the street for almost 15 minutes and had 25K frames. The captured video had a frame rate of 30 frames per second (fps) and a resolution of 1280×1024 pixels. In order to enable faster processing, frames were subsampled by a factor of 4 along the vertical and horizontal directions. Consequently, the video sequence after this spatial decimation had a frame of 30 fps and a resolution of 320×256 pixels.

A region of interest was defined in the captured video and the vehicles were monitored that passed through the virtual polygon corresponding to the region of interest. FIGS. 11-14 show the field of view of the camera and the virtual polygon on the image plane.

In order to evaluate the performance of the classification methods provided herein, the compression motion vectors were calculated as in the typical implementations of MPEG4 and H264. The motion estimation block size was set at 8×8 pixels and the search window size was set at 16×16. The block size choice determines, among other performance parameters, the smallest car-to-car distance the algorithm is able to resolve: a block size of m×n pixels will render the algorithm incapable of distinguishing between cars that are less than m+1 pixels apart as they move across the virtual target areas. The algorithm parameters were set as follows: $N_1=10$, $N_2=1$ and $T_1=100$. The vehicle classification was performed based on the area of the detected cluster of active motion blocks as described in Step e.

The video contained a total of 31 passenger cars and 4 trucks/buses in transit through the monitored traffic lane. The performance of the algorithm in terms of its ability for the classification is illustrated in Table 1.

TABLE 1

Summary of algorithm performance.

| Number of Passenger Vehicles | Number of Trucks/Buses | Correctly Classified Passenger Cars | Correctly Classified Trucks/Buses | Mis-Classification |
|---|---|---|---|---|
| 31 | 4 | 30 | 4 | 1 |

The algorithm correctly classified all 4 trucks/buses and correctly classified 30 passenger cars that traversed the target area. The successfully classified trucks/buses are shown in FIGS. 20-23. While it should be noted that the target area may capture vehicles moving in a different direction, detection and monitoring of those vehicles was automatically avoided using information contained in the orientation of the motion vectors.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method of classifying a vehicle captured with an image capturing device, the image capturing device oriented to include a field of view spanning a vehicle detection target region, the method comprising:
   a) generating a cluster of motion vectors representative of a vehicle detected within the target region, the cluster of motion vectors including motion vectors representative of the vehicle's body detected within the target region;
   b) associating one or more attributes with the cluster of motion vectors; and
   c) classifying the vehicle detected according to the one or more attributes associated with the cluster of motion vectors.

2. The computer implemented method of classifying a vehicle according to claim 1, wherein the motion vectors are compression type motion vectors.

3. The computer implemented method of classifying a vehicle according to claim 1, wherein step a) generates a cluster of compression type motion vectors representative of a vehicle detected within a virtual target area associated with the image capturing device field of view.

4. The computer implemented method of classifying a vehicle according to claim 1, wherein step c) classifies the vehicle detected as one of a relatively large size vehicle, a relatively small size vehicle, a truck, a bus, a passenger vehicle, and a motorcycle.

5. The computer implemented method of classifying a vehicle according to claim 1, wherein the one or more attributes includes geometrical attributes associated with the cluster of motion vector, the geometrical attributes including one or more of area, length, height, width, and eccentricity.

6. The computer implemented method of classifying a vehicle according to claim 1, wherein the one or more attributes includes a physical length of the detected vehicle obtained by mapping pixel coordinates associated with the cluster of motion vectors to actual units of length.

7. The computer implemented method of classifying a vehicle according to claim 1, wherein the vehicle classification is embedded in compressed data representative of one or more image frames captured with the image capturing device.

8. The computer implemented method of classifying a vehicle according to claim 1, wherein the image capturing device is one of a visible light video camera, infrared video camera, thermal video camera and satellite imaging video camera.

9. An image capturing system for classifying a vehicle captured by the image capturing system, the image capturing system comprising:
   an image capturing device oriented to include a field of view spanning a vehicle detection target region; and
   an image processor operatively associated with the image capturing device, the image processor configured to perform a method of classifying a vehicle captured with the image capturing device comprising:
   a) generating a cluster of motion vectors representative of a vehicle detected within the target region, the cluster of motion vectors including motion vectors representative of the vehicle's body detected within the target region;
   b) associating one or more attributes with the cluster of motion vectors; and
   c) classifying the vehicle detected according to the one or more attributes associated with the cluster of motion vectors.

10. The image capturing system for classifying a vehicle according to claim 9, wherein the motion vectors are compression type motion vectors.

11. The image capturing system for classifying a vehicle according to claim 9, wherein step a) generates a cluster of compression type motion vectors representative of a vehicle detected within a virtual target area associated with the image capturing device field of view.

12. The image capturing system for classifying a vehicle according to claim 9, wherein step c) classifies the vehicle detected as one of a relatively large size vehicle, a relatively small size vehicle, a truck, a bus, a passenger vehicle, and a motorcycle.

13. The image capturing system for classifying a vehicle according to claim 9, wherein the one or more attributes includes geometrical attributes associated with the cluster of motion vector, the geometrical attributes including one or more of area, length, height, width, and eccentricity.

14. The image capturing system for classifying a vehicle according to claim 9, wherein the one or more attributes includes a physical length of the detected vehicle obtained by mapping pixel coordinates associated with the cluster of motion vectors to actual units of length.

15. The image capturing system for classifying a vehicle according to claim 9, wherein the vehicle classification is embedded in compressed data representative of one or more image frames captured with the image capturing device.

16. The image capturing system for classifying a vehicle according to claim 9, wherein the image capturing device is one of a visible light video camera, infrared video camera, thermal video camera and satellite imaging video camera.

17. A computer implemented method of classifying a vehicle captured with an image capturing device, the image capturing device associated with a field of view including a vehicle detection target region:
   a) extracting a cluster of motion vectors representative of a vehicle detected within the target region, the cluster of motion vectors including motion vectors representative of the vehicle's body detected within the target region;
   b) associating one or more attributes with the cluster of motion vectors; and
   c) classifying the vehicle detected according to the one or more attributes associated with the cluster of motion vectors.

18. The computer implemented method of classifying a vehicle according to claim 17, wherein step c) classifies the vehicle detected as one of a relatively large size vehicle, a relatively small size vehicle, a truck, a bus, a passenger vehicle, and a motorcycle.

19. The computer implemented method of classifying a vehicle according to claim 17, wherein the one or more attributes includes geometrical attributes associated with the cluster of motion vector, the geometrical attributes including one or more of area, length, height, width, and eccentricity.

20. The computer implemented method of classifying a vehicle according to claim 17, wherein the one or more attributes includes a physical length of the detected vehicle obtained by mapping pixel coordinates associated with the cluster of motion vectors to actual units of length.

21. The computer implemented method of classifying a vehicle according to claim 17, wherein the vehicle classification is embedded in compressed data representative of one or more image frames captured with the image capturing device.

22. The computer implemented method of classifying a vehicle according to claim 17, wherein the image capturing device is one of a visible light video camera, infrared video camera, thermal video camera and satellite imaging video camera.

23. An image processing system for classifying a vehicle captured with an image capturing device, the image processing system comprising:
   an image processor configured to perform a method comprising:
   a) extracting a cluster of motion vectors representative of a vehicle detected within a target region associated with the image capturing device, the cluster of motion vectors including motion vectors representative of the vehicle's body detected within the target region;
   b) associating one or more attributes with the cluster of motion vectors; and
   c) classifying the vehicle detected according to the one or more attributes associated with the cluster of motion vectors.

24. The image capturing system for classifying a vehicle according to claim 23, wherein the image capturing device is one of a visible light video camera, infrared video camera, thermal video camera and satellite imaging video camera.

25. The image capturing system for classifying a vehicle according to claim 23, wherein the one or more attributes includes geometrical attributes associated with the cluster of motion vector, the geometrical attributes including one or more of area, length, height, width, and eccentricity.

26. The image capturing system for classifying a vehicle according to claim 23, wherein the one or more attributes includes a physical length of the detected vehicle obtained by mapping pixel coordinates associated with the cluster of motion vectors to actual units of length.

27. The image capturing system for classifying a vehicle according to claim 23, wherein the vehicle classification is embedded in compressed data representative of one or more image frames captured with the image capturing device.

28. The image capturing system for classifying a vehicle according to claim 23, wherein step c) classifies the vehicle detected as one of a relatively large size vehicle, a relatively small size vehicle, a truck, a bus, a passenger vehicle, and a motorcycle.

* * * * *